(12) United States Patent
Hsu

(10) Patent No.: US 8,132,970 B2
(45) Date of Patent: Mar. 13, 2012

(54) OPTICAL FIBER CONNECTOR

(75) Inventor: Min-Chao Hsu, Hsin Tien (TW)

(73) Assignee: Advanced-Connectek Inc., Hsintien, Taipei County (TW)

( * ) Notice: Subject to any disclaimer, the term of this patent is extended or adjusted under 35 U.S.C. 154(b) by 150 days.

(21) Appl. No.: 12/796,465

(22) Filed: Jun. 8, 2010

(65) Prior Publication Data
US 2011/0243503 A1 Oct. 6, 2011

(30) Foreign Application Priority Data
Mar. 31, 2010 (TW) .............................. 99205666 U

(51) Int. Cl.
*G02B 6/36* (2006.01)
(52) U.S. Cl. ................. 385/77; 385/69; 385/70; 385/84
(58) Field of Classification Search ........................ None
See application file for complete search history.

(56) References Cited

U.S. PATENT DOCUMENTS

| 6,293,710 | B1 | 9/2001 | Lampert et al. |
| 2003/0002811 | A1* | 1/2003 | Schmidt et al. ................. 385/77 |
| 2008/0273855 | A1* | 11/2008 | Bradley et al. ................ 385/139 |

* cited by examiner

*Primary Examiner* — Hemang Sanghavi
(74) *Attorney, Agent, or Firm* — Morris Manning & Martin LLP; Tim Tingkang Xia, Esq.

(57) ABSTRACT

An optical fiber connector in accordance with the present invention prevents moisture from entering the optical fiber connector and comprises a core tube, a tightening assembly, a connecting ring, a water-resistant ring, a compressing tube, a water-resistant tube and an end tube. The tightening assembly is mounted tightly on the core tube and comprises a first tightening component and a second tightening component. The connecting ring is mounted on the second tightening component. The annular gasket is mounted on the first tightening component and in the connecting ring. The compressing tube is mounted on the second tightening component. The water-resistant tube is mounted on the compressing tube and the second tightening component. The end tube is mounted on the water-resistant tube.

13 Claims, 5 Drawing Sheets

OPTICAL FIBER CONNECTOR

CROSS-REFERENCE TO RELATED APPLICATIONS

This non-provisional application claims priority under 35 U.S.C. §119(a) on Patent Application No(s). 099205666 filed in Taiwan, R.O.C. on Mar. 31, 2010, the entire contents of which are hereby incorporated by reference.

FIELD OF THE INVENTION

The present invention comprises an optical fiber connector with components that prevent moisture from entering the optical fiber connector.

BACKGROUND OF THE INVENTION

Optical fibers are widely used in communication transmission, permit signal transmission over longer distances and at higher bandwidths than other forms of communications and are made up of a core, a reflective coating and a protective coating. Optical fibers are used instead of metal wires because signals travel along them with less loss and the optical fibers do not transmit electromagnetic interference. The core is a glass or plastic filament that transmits light. The reflective coating is a different glass or plastic with a lower index of refraction and reflects light in the core back into the core. The protective coating keeps the core and the reflective coating from being damaged.

To connect optical fibers to electric devices to transmit signals, a conventional optical fiber connector has been developed and manufactured to interface optical fibers with electric devices. The conventional optical fiber connector is a plug and is plugged into an adapter that is a receptacle of an electric device to transmit signals.

However, conventional optical fiber connectors cannot prevent moisture from entering and passing through the connector. Moisture entering the conventional optical fiber connector will damage the connector and will adversely affect light transmission through the connector.

SUMMARY OF THE INVENTION

The objective of the present invention is to provide an optical fiber connector that prevents moisture from entering the optical fiber connector.

The optical fiber connector in accordance with the present invention comprises a core tube, a tightening assembly, a connecting ring, an annular gasket, a compressing tube, a watertight tube and an end tube. The tightening assembly is mounted tightly on the core tube and comprises a first tightening component and a second tightening component. The connecting ring is mounted on the second tightening component. The annular gasket is mounted on the first tightening component and in the connecting ring. The compressing tube is mounted on the second tightening component. The watertight tube is mounted on the compressing tube and the second tightening component. The end tube is mounted on the watertight tube.

DETAILED DESCRIPTION OF THE PRESENT INVENTION

Figure 1:
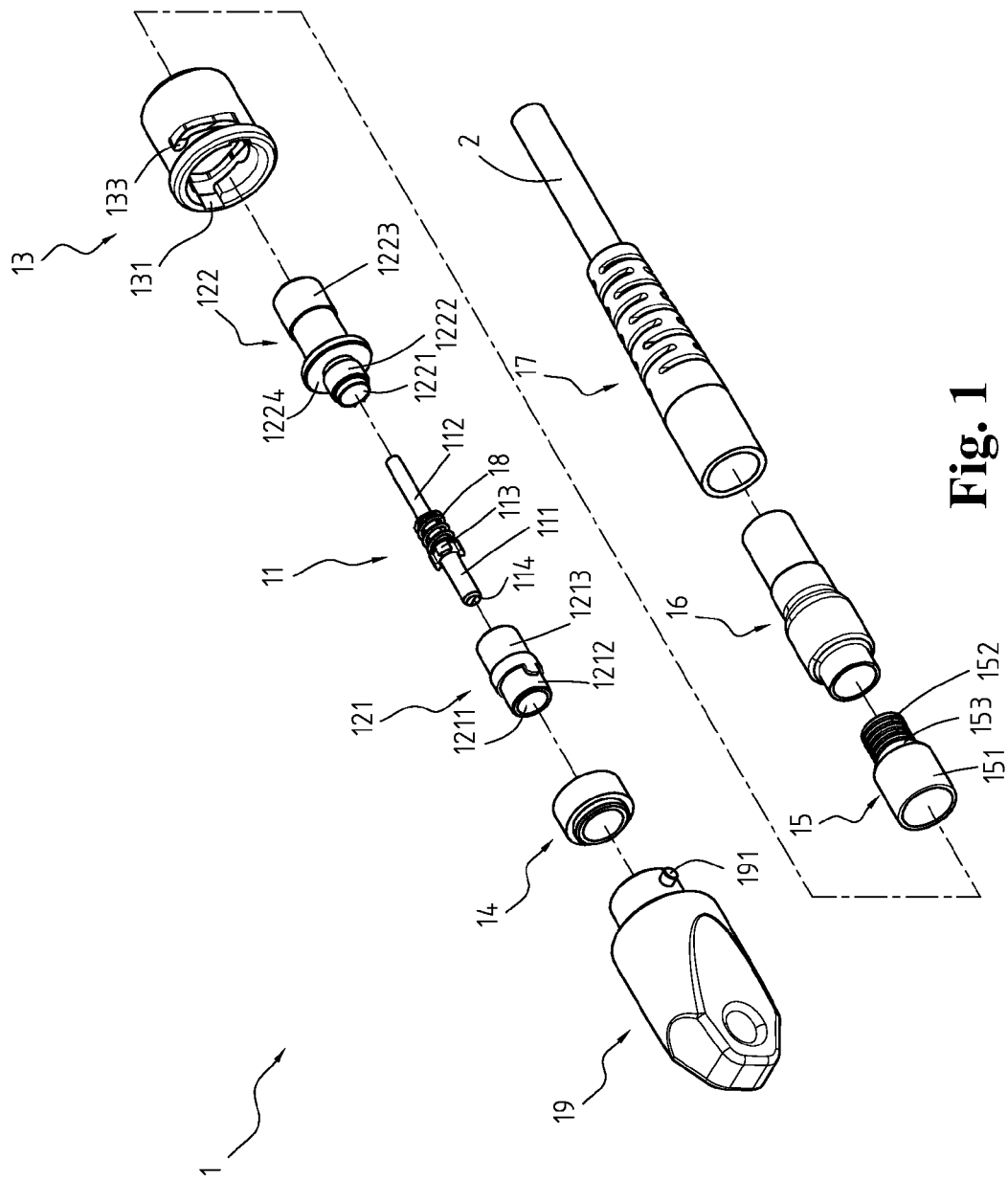
FIG. 1 is an exploded perspective view from a distal end of an optical fiber connector in accordance with the present invention.
Figure 2:
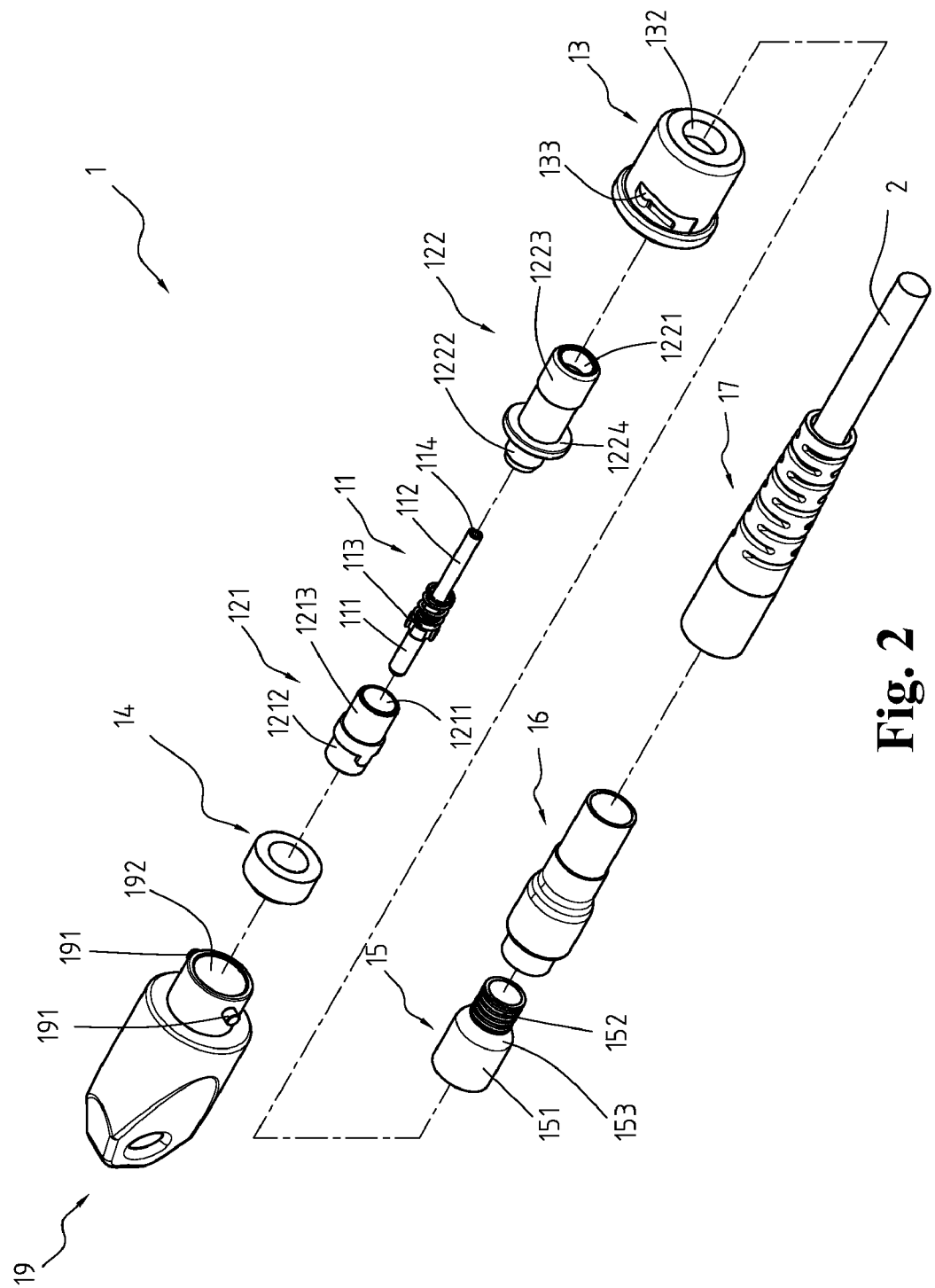
FIG. 2 is an exploded top perspective view from a proximal end of the optical fiber connector in FIG. 1.
Figure 3:
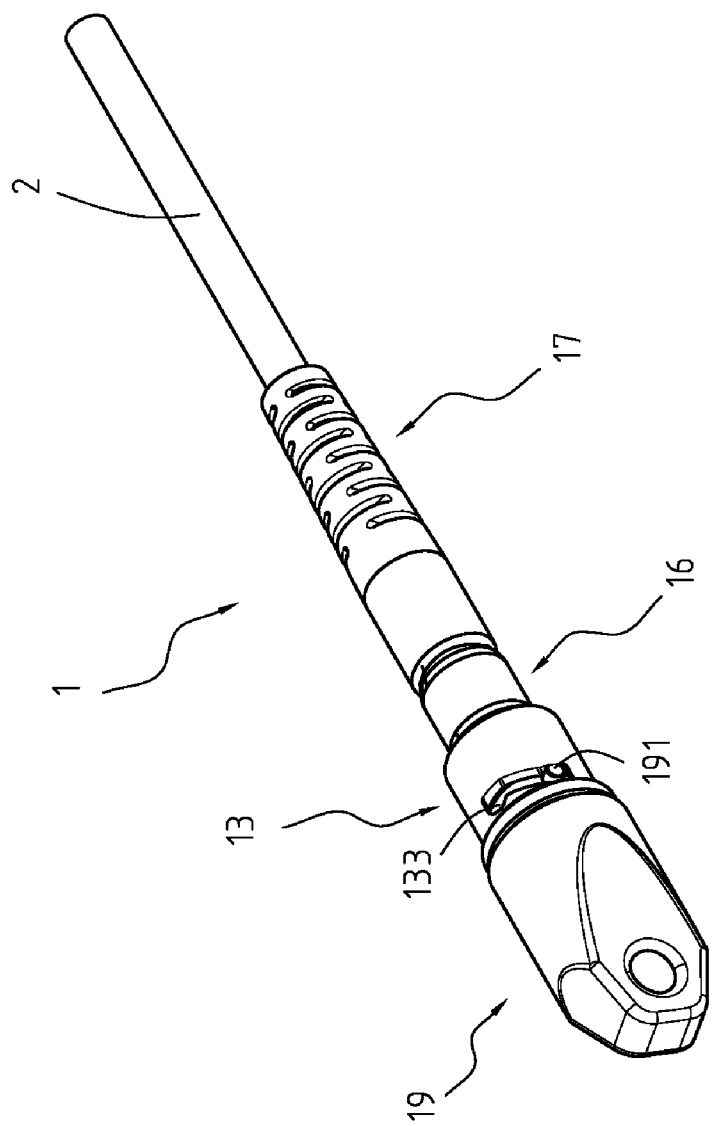
FIG. 3 is a perspective view from the distal end of the optical fiber connector in FIG. 1.
Figure 4:
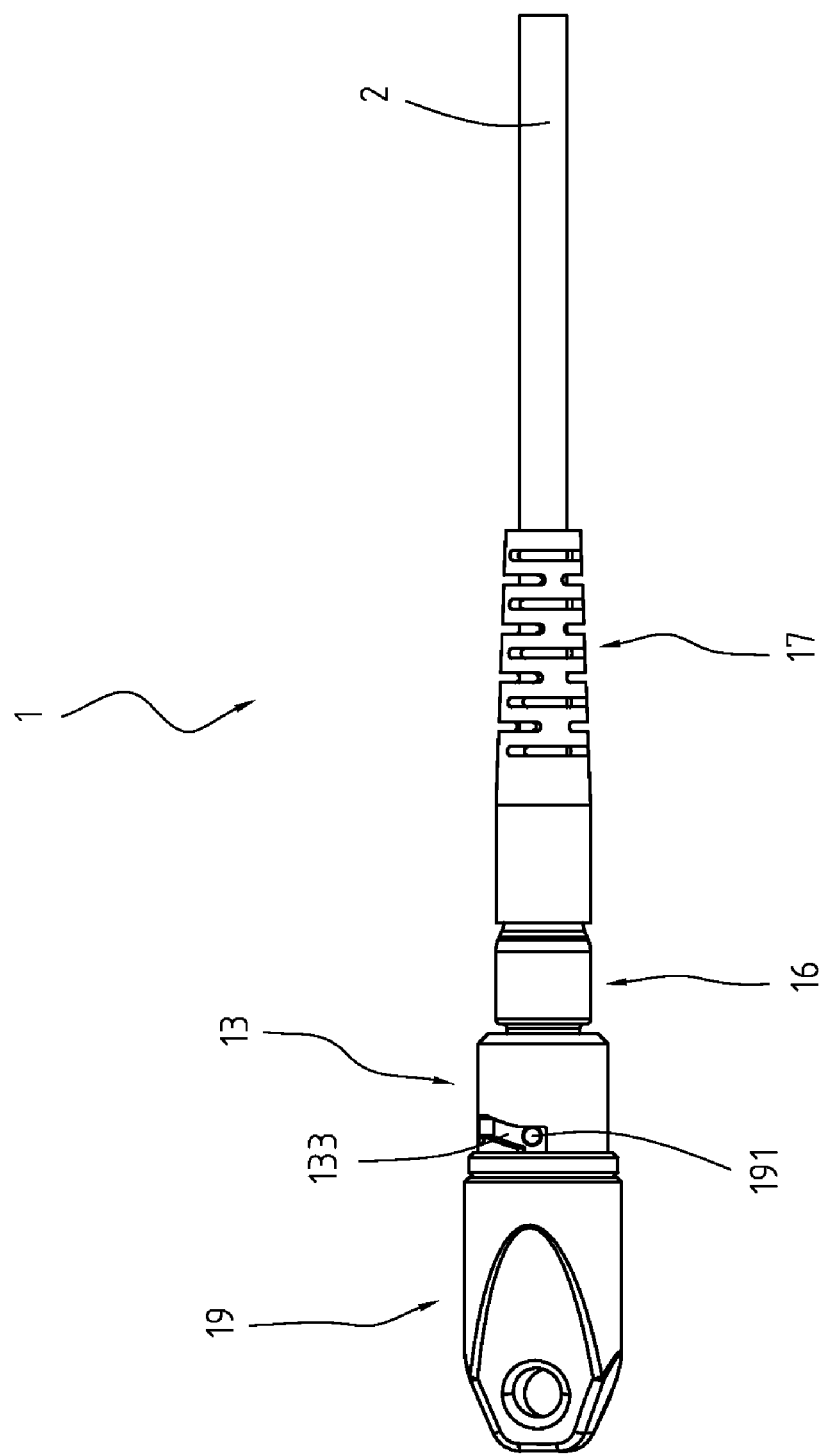
FIG. 4 is a side view of the optical fiber connector in FIG. 3.
Figure 5:
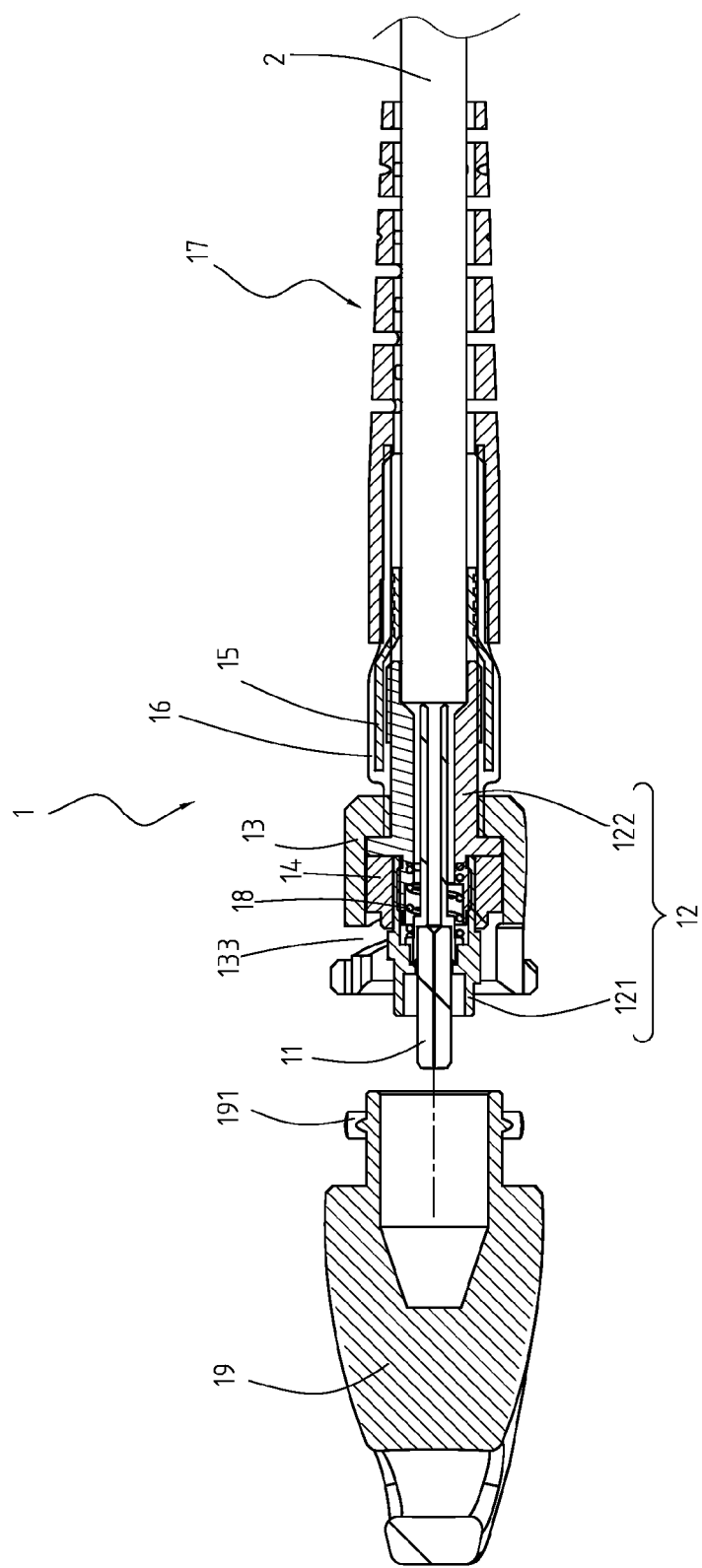
FIG. 5 is a cross-sectional side view of the optical fiber connector in FIG. 3.

With reference to FIGS. 1, 2, 3, 4 and 5, an optical fiber connector (1) in accordance with the present invention is connected to an optical fiber cable (2) that has an optical fiber (not shown) and multiple protection fibers (not shown) surrounding the optical fiber, is connected to an electrical device (not shown) that has an adapter (not shown) to transmit and receive signals, may be a ferrule connector and comprises a core tube (11), a tightening assembly (12), a connecting ring (13), an annular gasket (14), a compressing tube (15), a watertight tube (16), an end tube (17), an optional spring (18) and an optional protective cap (19).

The core tube (11) is mounted around the optical fiber that allows light to pass therethrough and comprises a distal tube (111), a proximal tube (112), an annular lip (113) and a through hole (114). The distal tube (111) has a distal end and a proximal end. The proximal tube (112) has a distal end and a proximal end. The distal end of the proximal tube (112) is connected to the proximal end of the distal tube (111). The annular lip (113) is formed on the proximal end of the distal tube (111) and the distal end of the proximal tube (112). The through hole (114) is formed through the distal tube (111) and proximal tube (112).

The tightening assembly (12) is mounted on the core tube (11) and comprises a distal tightening component (121) and a proximal tightening component (122).

The distal tightening component (121) corresponds to the distal tube (111) and has a through hole (1211), a distal segment (1212) and a proximal segment (1213). The through hole (1211) is formed longitudinally through the distal tightening component (121). The proximal segment (1213) is connected to the distal segment (1212).

The proximal tightening component (122) corresponds to the proximal tube (112), is mounted in the proximal segment (1213) of the distal tightening component (121) and has a through hole (1221), a distal segment (1222), a proximal segment (1223) and an annular protrusion (1224). The through hole (1221) is formed longitudinally through the proximal tightening component (122). The distal segment (1222) is mounted in the proximal segment (1213) of the distal tightening component (121). The proximal segment (1223) is surrounded by the multiple protection fibers and is connected to the distal segment (1222) of the proximal tightening component (122). The annular protrusion (1224) is formed between the distal segment (1222) of the proximal tightening component (122) and proximal segment (1223) of the proximal tightening component (122).

The connecting ring (13) is connected to the adapter of the electrical device when signals are transmitted and received, is mounted on the proximal tightening component (122) around the distal segment (1222) of the proximal tightening component (122) and the distal tightening component (121) and has an annular sidewall, a distal opening (131), a proximal opening (132) and two optional slots (133).

The annular sidewall has a distal end, a proximal end and a longitudinal passage.

The distal opening (131) is formed on the distal end and is mounted around the distal tube (111) of the core tube (11) and the distal segment (1212) of the distal tightening component (121).

The proximal opening (132) is formed on the proximal end, communicates with the distal opening (131), is mounted around the proximal segment (1223) of the proximal tightening component (122) and has an annular lip. The annular lip protrudes in from the proximal opening (132).

The two slots (133) are formed opposite to and aligned with each other through the annular sidewall.

The annular gasket (14) is mounted on the proximal segment (1213) of the distal tightening component (121) in the connecting ring (13) to prevent moisture from entering the optical fiber connector and may be a rubber ring.

The compressing tube (15) is mounted around the multiple protection fibers and on the proximal tightening component (122) and has a distal segment (151), a junction (153) and a proximal segment (152). The distal segment (151) is mounted on the proximal segment (1223) of the proximal tightening component (122) and constricts the multiple protection fibers that surround the proximal segment (1223) of the proximal tightening component (122). The junction (153) is formed longitudinally on the distal segment (151) of the compressing tube (15). The proximal segment (152) is formed longitudinally on the junction (153) and is smaller than the distal segment (151) of the compressing tube (15).

The watertight tube (16) is mounted on the compressing tube (15) and the proximal segment (1223) of the proximal tightening component (122) to prevent moisture from entering and may be a heat-shrinkable tube.

The end tube (17) is mounted longitudinally on the watertight tube (16) and the optical fiber cable (2).

The spring (18) is mounted around the proximal tube (112) of the core tube (11) against the annular lip (113).

The protective cap (19) is mounted on and connected to the connecting ring (13) to protect the core tube (11) from physical damage when the optical fiber connector (1) is not being used and has a proximal end, two anchor protrusions (191) and a cavity (192). The proximal end is mounted on the connecting ring (13) through the distal opening (131). The two anchor protrusions (191) are formed on and protrude radially out from the proximal end, correspond respectively to and connect respectively to the two slots (133) to attach the protective cap (19) to the connecting ring (13). The cavity (192) is formed in the proximal end to cover the distal tube (111) of the core tube (11) and the distal segment (1212) of the distal tightening component (121) to protect them from being damaged.

What is claimed is:

1. An optical fiber connector being connected to an optical fiber cable and comprising:
    a core tube comprising:
    a distal tube;
    a proximal tube being connected to the distal tube;
    an annular lip being formed on a connection between the distal tube and the proximal tube; and
    a through hole being formed through the distal tube and the proximal tube;
    a tightening assembly being mounted on the core tube and comprising:
    a distal tightening component corresponding to the distal tube; and
    a proximal tightening component corresponding to the proximal tube;
    a connecting ring being mounted on the proximal tightening component and the distal tightening component and having:
    an annular sidewall;
    a distal opening; and
    a proximal opening communicating with the distal opening;
    an annular gasket being mounted on the distal tightening component in the connecting ring;
    a compressing tube being mounted on the proximal tightening component;
    a watertight tube being mounted on the compressing tube and the proximal tightening component; and
    an end tube being mounted longitudinally on the watertight tube and the optical fiber cable.

2. The optical fiber connector as claimed as claim 1, further comprising a spring being mounted around the proximal tube of the core tube against the annular lip of the core tube.

3. The optical fiber connector as claimed as claim 1, wherein the connecting ring having two slots being formed opposite to and aligned with each other through the annular sidewall.

4. The optical fiber connector as claimed as claim 3, further comprising a protective cap being mounted on and connected to the connecting ring.

5. The optical fiber connector as claimed as claim 4, wherein the protective cap comprising:
    a proximal end being mounted on the connecting ring through the distal opening;
    two anchor protrusions being formed on and protruding radially out from the proximal end, corresponding respectively to and connecting respectively to the two slots; and
    a cavity being formed in the proximal end.

6. The optical fiber connector as claimed as claim 1, wherein the distal tightening component having:
    a through hole being formed longitudinally through the distal tightening component;
    a distal segment; and
    a proximal segment being connected to the distal segment.

7. The optical fiber connector as claimed as claim 1, wherein the annular gasket is a rubber ring.

8. The optical fiber connector as claimed as claim 1, wherein the watertight tube is a heat-shrinkable tube.

9. The optical fiber connector as claimed as claim 1, wherein the optical fiber connector is a ferrule connector.

10. The optical fiber connector as claimed as claim 6, wherein the proximal tightening component corresponding to the proximal tube, being mounted in the proximal segment of the distal tightening component and having:
    a through hole being formed longitudinally through the proximal tightening component;
    a distal segment being mounted in the proximal segment of the distal tightening component;
    a proximal segment being connected to the distal segment of the proximal tightening component; and
    an annular protrusion being formed between the distal segment of the proximal tightening component and proximal segment of the proximal tightening component.

11. The optical fiber connector as claimed as claim 10, wherein the proximal opening of the connecting ring being mounted around the proximal segment of the proximal tightening component and has an annular lip.

12. The optical fiber connector as claimed as claim 10, wherein the compressing tube having:
- a distal segment being mounted on the proximal segment of the proximal tightening component;
- a junction being formed longitudinally on the distal segment of the compressing tube; and
- a proximal segment being formed longitudinally on the junction and being smaller than the distal segment of the compressing tube.

13. The optical fiber connector as claimed as claim 11, wherein the annular lip of the proximal opening protruding in from the proximal opening of the connecting ring.

* * * * *